United States Patent
Jones et al.

(10) Patent No.: US 11,603,646 B2
(45) Date of Patent: Mar. 14, 2023

(54) EARTHMOVING FLOW VECTOR GENERATION USING NODE AND CONNECTION INPUT GRAPH

(71) Applicant: Caterpillar Trimble Control Technologies LLC, Dayton, OH (US)

(72) Inventors: Nathan Jones, Christchurch (NZ); Joseph Corbett-Davies, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 499 days.

(21) Appl. No.: 16/717,121

(22) Filed: Dec. 17, 2019

(65) Prior Publication Data

US 2021/0180295 A1    Jun. 17, 2021

(51) Int. Cl.
*E02F 9/26* (2006.01)
*E02F 9/20* (2006.01)
(Continued)

(52) U.S. Cl.
CPC ............ *E02F 9/262* (2013.01); *E02F 9/2045* (2013.01); *E02F 9/265* (2013.01); *G01C 21/38* (2020.08); *G01C 21/3867* (2020.08); *G05D 1/0217* (2013.01); *G06Q 10/047* (2013.01); *G06T 17/05* (2013.01); *G05D 2201/0202* (2013.01)

(58) Field of Classification Search
CPC .......... G06T 17/05; G06T 17/10; E02F 9/262; E02F 9/205; E02F 9/2045; E02F 9/2029; G01S 17/89; G06F 30/13; G06Q 10/06398; G06Q 10/063114; G08G 1/081; H04L 45/122
See application file for complete search history.

(56) References Cited

U.S. PATENT DOCUMENTS 9,260,837 B1 * 2/2016 Wei ..................... E02F 9/2045
10,198,534 B2 * 2/2019 Blanchard ............... G06F 30/13
(Continued)

FOREIGN PATENT DOCUMENTS

| CN | 109039886 A | * 12/2018 | ........... H04L 45/122 |
| EP | 3 217 380 A1 | 9/2017 | |
| JP | 2005182219 A | * 7/2005 | ............. G08G 1/081 |

OTHER PUBLICATIONS

International Search Report and Written Opinion for Application No. PCT/US2020/065107, dated May 18, 2021, 18 pages.

*Primary Examiner* — Yuri Kan
(74) *Attorney, Agent, or Firm* — Kilpatrick Townsend & Stockton

(57) ABSTRACT

Techniques for generating earthmoving flow vectors for assisting control of a construction machine are disclosed. A design elevation map of an earthmoving site may be obtained. The design elevation map may include a plurality of design elevation points of the earthmoving site. An actual elevation map of the earthmoving site may be obtained. The actual elevation map may include a plurality of actual elevation points of the earthmoving site. A dual-layer input graph may be formed based on the design elevation map and the actual elevation map. The dual-layer input graph may include a plurality of nodes related through a plurality of connections. A flow graph may be generated by solving the dual-layer input graph. The flow graph may include a set of flow vectors indicating movement of the earth within the earthmoving site.

20 Claims, 16 Drawing Sheets

(51) Int. Cl.
*G05D 1/02* (2020.01)
*G06Q 10/04* (2012.01)
*G06T 17/05* (2011.01)
*G01C 21/00* (2006.01)
*G06Q 10/047* (2023.01)

(56) References Cited

U.S. PATENT DOCUMENTS

| | | | |
|---|---|---|---|
| 10,365,404 B2 * | 7/2019 | Collins | G01S 17/89 |
| 2007/0080961 A1 * | 4/2007 | Inzinga | G06T 17/10 |
| | | | 345/419 |
| 2016/0258129 A1 * | 9/2016 | Wei | E02F 9/2029 |
| 2016/0343095 A1 * | 11/2016 | Wei | G06Q 10/06398 |
| 2018/0335784 A1 * | 11/2018 | Wei | E02F 9/262 |
| 2019/0055715 A1 * | 2/2019 | Wei | E02F 9/205 |
| 2019/0370726 A1 * | 12/2019 | Ha | G06Q 10/063114 |
| 2020/0032490 A1 * | 1/2020 | Ready-Campbell | E02F 9/262 |

\* cited by examiner

EARTHMOVING FLOW VECTOR GENERATION USING NODE AND CONNECTION INPUT GRAPH

BACKGROUND

Modern construction machines have dramatically increased the efficiency of performing various construction projects. For example, earthmoving machines employing automatic slope control systems are able to grade project areas using fewer passes and in less time than what was previously done manually. As another example, modern asphalt pavers and other road makers have allowed replacement of old roads and construction of new roads to occur on the order of hours and days instead of what once took place over weeks and months. Construction crews also now comprise fewer individuals due to the automation of various aspects of the construction process. Much of the technological advances of construction machines are owed in part to the availability of accurate sensors that allow real-time monitoring of the condition and position of a machine's components and/or the environment surrounding the machine.

For many construction projects, earthwork can account for a significant portion of the total construction cost (e.g., between 20%-30%). As such, an efficient earthwork design that describes the movement of earth (often in the form of locations at which cuts and fills are to be performed as well as the hauling paths therebetween) can be important to the overall performance of the project. For example, an efficient earthwork design can reduce the overall amount of earth that is cut and/or filled, thereby reducing the usage of costly heavy equipment such as excavators, trucks, loaders, and compactors. While some progress has been achieved in producing improved earthwork designs, new methods and other techniques are still needed.

SUMMARY

In a first aspect of the present invention, a control system for assisting control of a construction machine at an earthmoving site is provided. The control system may include one or more processors. The control system may also include one or more computer-readable media storing instructions that, when executed by the one or more processors, cause the one or more processors to perform operations. The operations may include obtaining a design elevation map of an earthmoving site. In some embodiments, the design elevation map includes a plurality of design elevation points of the earthmoving site. The operations may also include obtaining an actual elevation map of the earthmoving site. In some embodiments, the actual elevation map includes a plurality of actual elevation points of the earthmoving site. The operations may further include forming a dual-layer input graph based on the design elevation map and the actual elevation map. In some embodiments, the dual-layer input graph includes a plurality of nodes related through a plurality of connections. In some embodiments, each node of the plurality of nodes is associated with a value that is calculated based on an elevation difference between the design elevation map and the actual elevation map. In some embodiments, each connection of the plurality of connections is associated with a cost for moving earth within the earthmoving site along the connection. The method may further include generating a flow graph by solving the dual-layer input graph. In some embodiments, the flow graph includes a set of flow vectors indicating movement of the earth within the earthmoving site. The method may further include causing movement of the construction machine at the earthmoving site in accordance with the flow graph.

In some embodiments, the operations further comprise for each node of the plurality of nodes, calculating the value associated with the node based on the elevation difference between the design elevation map and the actual elevation map. In some embodiments, the operations further comprise for each connection of the plurality of connections, calculating the cost associated with the connection for moving the earth within the earthmoving site along the connection. In some embodiments, the plurality of nodes include a plurality of design elevation nodes and a plurality of actual elevation nodes. In some embodiments, each of the plurality of design elevation nodes is co-located with a corresponding one of the plurality of actual elevation nodes. In some embodiments, the plurality of connections includes a plurality of cross-map connections. In some embodiments, each of the plurality of cross-map connections extends between one of the plurality of design elevation nodes and one of the plurality of actual elevation nodes. In some embodiments, the plurality of connections includes a plurality of same-map connections, wherein each of the plurality of same-map connections extends between one of the plurality of design elevation nodes and a different one of the plurality of design elevation nodes or one of the plurality of actual elevation nodes and a different one of the plurality of actual elevation nodes.

In a second aspect of the present invention, a computer-implemented method is provided. The method may include obtaining a design elevation map of an earthmoving site. In some embodiments, the design elevation map includes a plurality of design elevation points of the earthmoving site. The method may also include obtaining an actual elevation map of the earthmoving site. In some embodiments, the actual elevation map includes a plurality of actual elevation points of the earthmoving site. The method may further include forming a dual-layer input graph based on the design elevation map and the actual elevation map. In some embodiments, the dual-layer input graph includes a plurality of nodes related through a plurality of connections. In some embodiments, each node of the plurality of nodes is associated with a value that is calculated based on an elevation difference between the design elevation map and the actual elevation map. In some embodiments, each connection of the plurality of connections is associated with a cost for moving earth within the earthmoving site along the connection. The method may further include generating a flow graph by solving the dual-layer input graph, wherein the flow graph includes a set of flow vectors indicating movement of the earth within the earthmoving site.

In some embodiments, the method further comprises for each node of the plurality of nodes, calculating the value associated with the node based on the elevation difference between the design elevation map and the actual elevation map. In some embodiments, the method further comprises for each connection of the plurality of connections, calculating the cost associated with the connection for moving the earth within the earthmoving site along the connection. In some embodiments, the plurality of nodes include a plurality of design elevation nodes and a plurality of actual elevation nodes. In some embodiments, each of the plurality of design elevation nodes is co-located with a corresponding one of the plurality of actual elevation nodes. In some embodiments, the plurality of connections includes a plurality of cross-map connections. In some embodiments, each of the plurality of cross-map connections extends between one of the plurality of design elevation nodes and one of the plurality of actual elevation nodes. In some embodiments, the plurality of connections includes a plurality of same-map connections. In some embodiments, each of the plurality of same-map connections extends between one of the plurality of design elevation nodes and a different one of the plurality of design elevation nodes or one of the plurality of actual elevation nodes and a different one of the plurality of actual elevation nodes. In some embodiments, the flow graph is a dual-layer flow graph that includes a flow vector of the set of flow vectors for each of the plurality of connections.

In a third aspect of the present invention, a non-transitory computer-readable medium storing instructions that, when executed by one or more processors, cause the one or more processors to perform operations is provided. In some embodiments, the operations may include the method described above in reference to the second aspect of the present invention.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
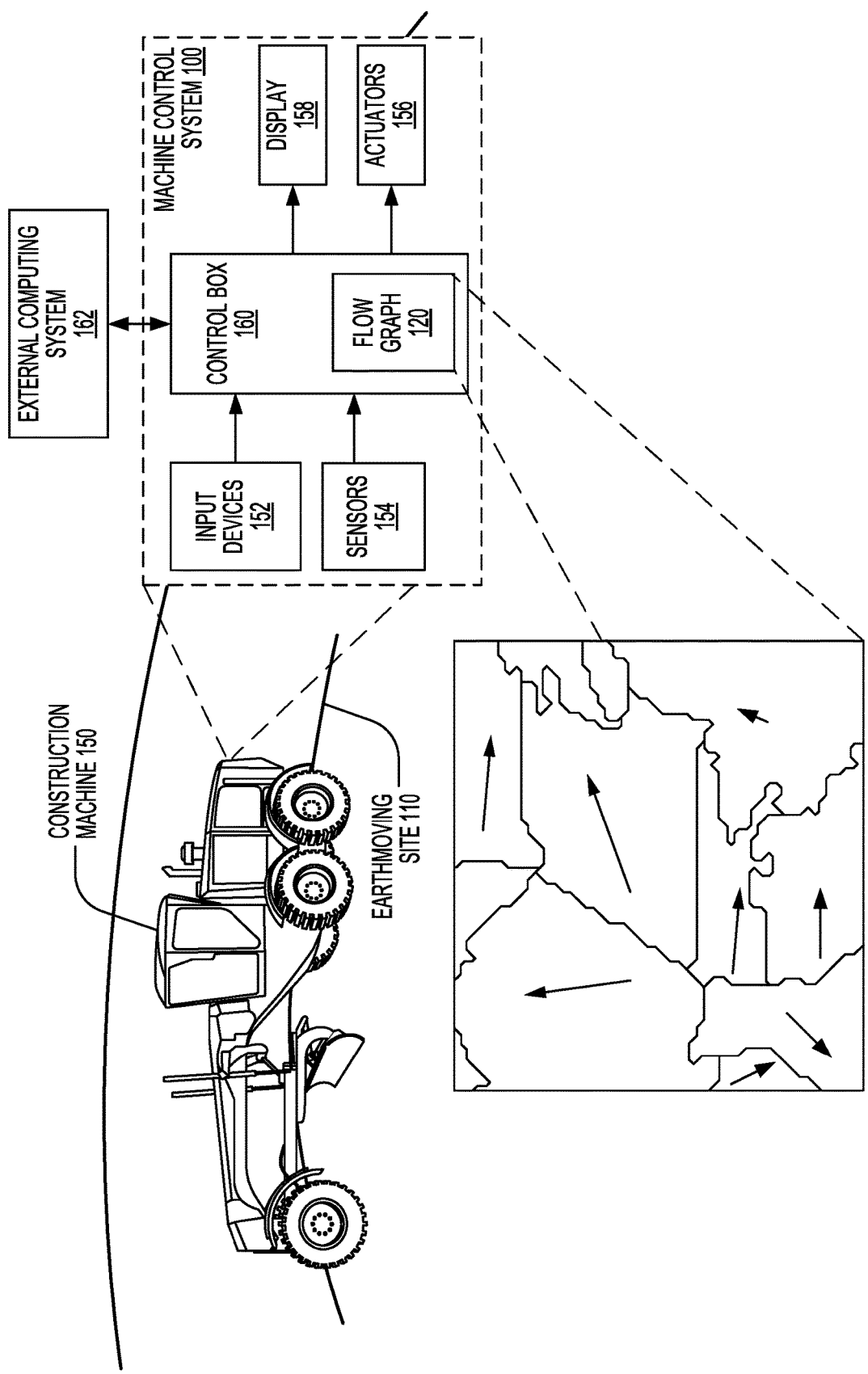
FIG. 1 illustrates a machine control system implemented within a construction environment for assisting control of a construction machine.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure provide improved techniques for assisting control of a construction machine in performing an earthmoving project through the generation of elevation-dependent flow graphs. The generated flow graphs may include a vector field along with cut and fill priority associated with each flow vector. In some embodiments, a flow graph is generated using an elevation-based input graph incorporating a cost function. The input graph can be dual layered, with one layer on current ground and the other on a design surface. Each layer may include multiple nodes (with both ground surface nodes and design surface nodes) that represent different cut/fill cells with volumes equal to the cut/fill volume. The nodes may be connected via multiple connections between nodes of the same type (referred to herein as same-map connections) as well as nodes of different types (referred to herein as cross-map connections).

In some implementations, each node is connected to 16 other nodes: 4 Cartesian neighbors, 4 diagonal neighbors, and 8 "two-hop" diagonal neighbors (nodes up to 2 columns or rows from the current node, such that no existing connection direction is repeated). Each of these connections may be bidirectional (which may be treated as 2 separate connections), with possibly asymmetric costs for different flow directions in accordance with a cost function. The cost function can be manipulated to penalize different types of movement differently, such as penalizing movement going uphill (e.g., assigning a higher cost) and rewarding movement going downhill (e.g., assigning a lower cost). Movement along the same elevation may be neither penalized nor rewarded.

In some instances, upon generating a flow graph through solving an input graph incorporating the cost function (e.g., using a minimum-cost flow algorithm), flow vector priority can be determined based on a number of factors. For example, a cut may be given priority if the optimal flow is over the design surface. As another example, a fill may be given priority if the optimal flow is anywhere other than over the current ground surface. Assignment priority may in some instances be facilitated through use of an adjustable parameter $b \geq 1$. If a connection in the input graph ends on a design surface node (originating from either another design surface node or a current ground node) then the cost is multiplied by the adjustable parameter b. In some implementations, the goal may be to increase b until very little flow is over the design surface, with the flows that are left over being of the highest priority. This is because even with the increased cost to flow over the design surface, the most efficient path may still be over the design surface. Thus, it can be important that the current surface is cut or filled to the design surface in these areas first, then b can be lowered to obtain lower priority flows.

Techniques described herein further provide for identification of self-contained cut/fill regions. By examining the flow vectors in the flow graph, regions can be identified in which there is no net flow in or out. The boundaries of these regions can correspond to "part lines", which give operators clear guidance as to where material should not cross for an optimal earthmoving process.

FIG. 1 illustrates a machine control system 100 implemented within a construction environment for assisting control of a construction machine 150, according to some embodiments of the present disclosure. In some embodiments, construction machine 150 may be deployed at a earthmoving site 110 in which volumes of earth are to be moved (e.g., cut and/or filled) such that the current ground surface is transformed into a desired design surface. While construction machine 150 is generally described herein as corresponding to an earthmoving construction machine, the various techniques described herein are applicable to a wide variety of construction machines such as graders, excavators, bulldozers, backhoes, pavers (e.g., concrete, asphalt, slipform, vibratory, etc.), compactors, scrapers, loaders, and the like. In some embodiments, construction machine 150 may include a tractor with wheels, axles, and a gasoline-, diesel-, electric-, or steam-powered engine for providing power and traction to construction machine 150 to drive along a desired path, often at a constant speed. An operator of construction machine 150 may control the machine within a cab using various input devices 152 such as levers, switches, buttons, pedals, steering wheels, touch screens, and the like.

The components of machine control system 100 may be mounted to or integrated with the components of construction machine 150 such that construction machine 150 may include machine control system 100. The components of machine control system 100 may be communicatively coupled to each other via one or more wired and/or wireless connections. To allow three-dimensional (3D) tracking of construction machine 150 as well as detection of the elevations of earthmoving site 110, machine control system 100 may include various sensors 154, such as rotation sensors, positioning sensors, scanners, cameras, and the like.

In some embodiments, sensors 154 may include an angle sensor, such as an inertial measurement unit (IMU). As used here, an angle sensor may refer to any electronic device capable of detecting angular rate and/or angular position. As such, an angle sensor as described herein may include an IMU. In some embodiments, an angle sensor may directly detect angular rate and may integrate to obtain angular position, or alternatively an angle sensor may directly measure angular position and may determine a change in angular position (e.g., determine the derivative) to obtain angular rate. In many instances, an angle sensor is used to determine the yaw angle (rotation angle with respect to a vertical axis), the pitch angle (rotation angle with respect to a transverse axis), and/or the roll angle (rotation angle with respect to a longitudinal axis).

In some embodiments, sensors 154 may include a position sensor, such as a Global Navigation Satellite System (GNSS) receiver. As used herein, an angle sensor may refer to any electronic device capable of detecting a 3D position within a world space. Such a device may correspond to a number of 3D positioning solutions, such as a GNSS receiver or a total station device that can establish a direct line of sight with a second nearby device to detect a 3D position. In some embodiments, a GNSS receiver may use wireless signals that are transmitted from medium Earth orbit (MEO) or geostationary Earth orbit (GEO) satellites to GNSS receivers to determine position, velocity, and time information for the GNSS receivers. Examples of currently operational GNSSs include the United States' Global Positioning System (GPS), the Russian Global Navigation Satellite System (GLONASS), the Chinese BeiDou Satellite Navigation System, the European Union's (EU) Galileo, and the Satellite-based Augmentation System (SBAS).

Machine control system 100 may include a control box 160 that receives data from sensors 154, input devices 152, and an external computing system 162, generates commands that are sent to actuators 156 to control a operational position of any of actuators 156, and provides visual instructions or indicators that are displayed on a display 158. Control box 160 may include one or more processors and an associated memory. In some embodiments, control box 160 may be communicatively coupled to central computing system 162 located external to machine control system 100 and construction machine 150. Central computing system 162 may send instructions to control box 160 of the details of a grading operation, such as an area to be graded, a desired slope, etc. Central computing system 162 may also send alerts and other general information to control box 160, such as traffic conditions, weather conditions, the locations and status of material transfer vehicles, and the like.

In some embodiments, machine control system 100 may generate and maintain a flow graph 120. In some embodiments, flow graph 120 can be represented as a top down view of earthmoving site 110 with flow arrows indicating earth to be moved by construction machine 150. Flow graph 120 may include various self-contained regions separated by part lines. The self-contained regions and part lines can give an operator of construction machine 150 guidance about where, for example, the dominant cut "ridge" needs to be divided, with some earth moving to one side and some earth moving to the other side. Flow vectors (illustrated with arrows) in each of the self-contained regions may be drawn from the centroid of the cut cells to the centroid of the fill cells within the region.

Figure 2:
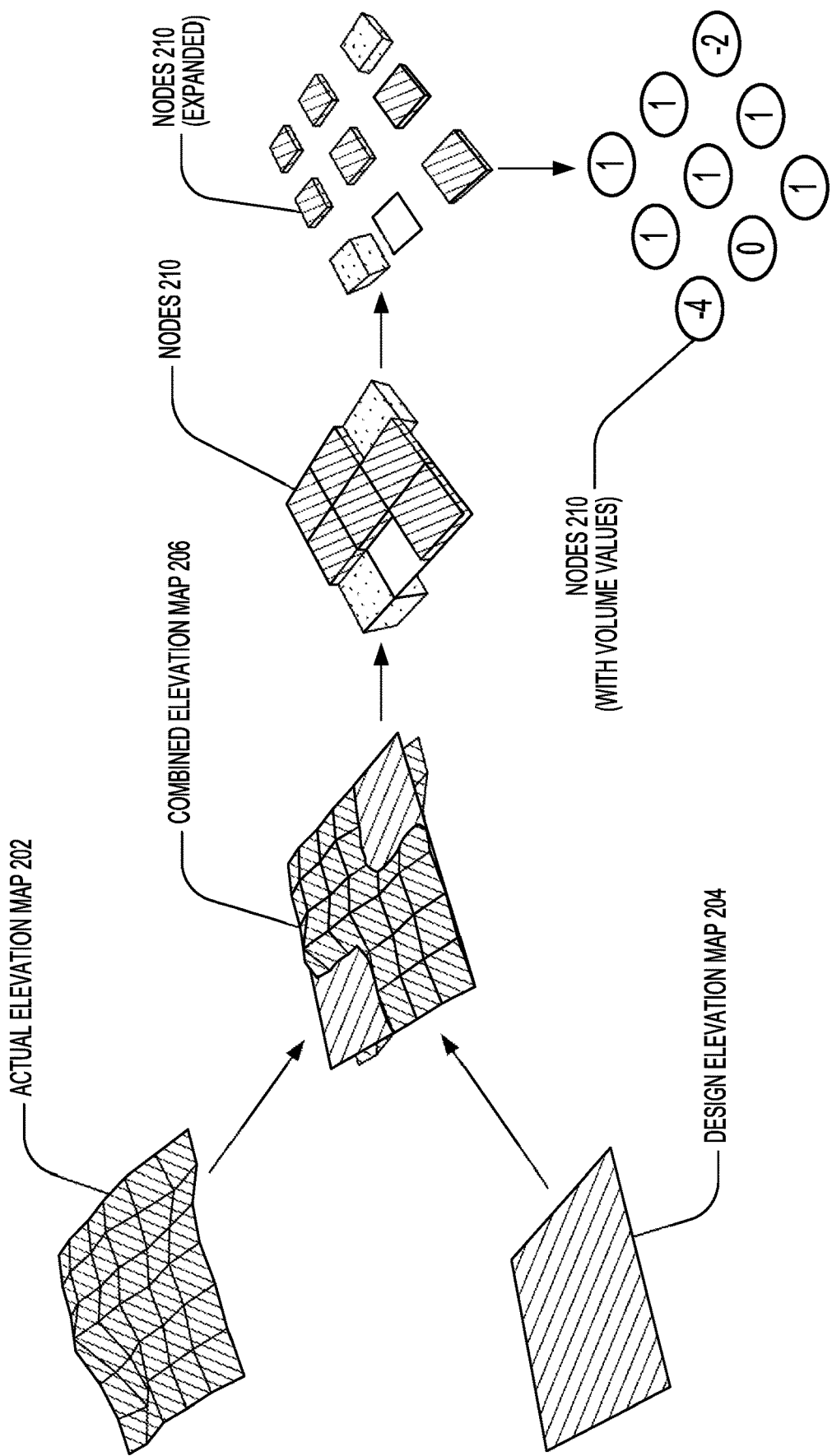
FIG. 2 illustrates examples of various steps that may be performed by a machine control system for generating a flow graph by forming an input graph made up of multiple nodes.

FIG. 2 illustrates examples of various steps that may be performed by machine control system 100 for generating a flow graph by forming an input graph made up of multiple nodes 210. In some embodiments, an actual elevation map 202 and a design elevation map 204 of earthmoving site 110 are obtained by machine control system 100. Each of the elevation maps may comprise elevation points corresponding to earthmoving site 110 over a two-dimensional (2D) area. Actual elevation map 202 may correspond to the actual ground surface of earthmoving site 110 and may be detected using one or more sensors. Design elevation map 204 may correspond to a desired ground surface of earthmoving site 110 and may be provided via input devices 152, received from external computing system 162, and/or generated within machine control system 100.

In some embodiments, actual elevation map 202 and design elevation map 204 may be combined to create a combined elevation map 206. In various embodiments, combined elevation map 206 may be calculated as the difference between actual elevation map 202 and design elevation map 204, as the a superposition of actual elevation map 202 and design elevation map 204, or some other combination of the elevation maps. In some embodiments, nodes 210 may be calculated based on combined elevation map 206. Nodes 210 may be spread over the same 2D area as actual elevation map 202 and design elevation map 204, and each of nodes 210 may be associated with a volume value that may be calculated based on (e.g., set equal to) the difference between an elevation point within actual elevation map 202 and a corresponding elevation point within design elevation map 204. Each of the volume values may correspond to the amount of earth that is to be moved (e.g., cut and/or filled) such that earthmoving site 110 is transformed into design elevation map 204.

Figure 3A:
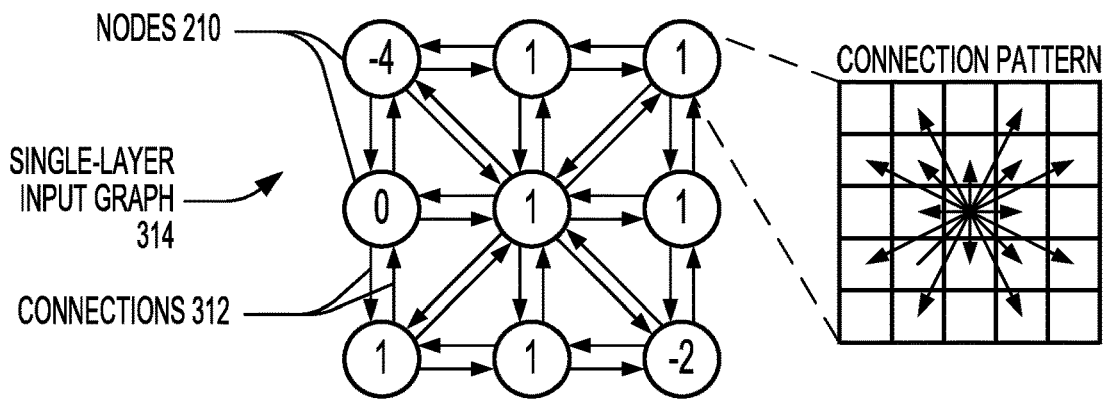
FIGS. 3A-3F illustrate examples of various steps that may be performed by a machine control system for generating a flow graph by forming a single-layer input graph made up of multiple nodes and multiple connections.

FIGS. 3A-3F illustrate examples of various steps that may be performed by machine control system 100 for generating a flow graph by forming a single-layer input graph 314 made up of multiple nodes 210 and multiple connections 312. FIG. 3A illustrates an example of single-layer input graph 314 that may be formed by nodes 210 that are related through connections 312. While connections 312 are only illustrated in FIG. 3A between adjacent and diagonally-related nodes 210 for purposes of clarity, connections 312 may be formed between nearby nodes in accordance with the illustrated connection pattern, which further includes connections between nodes related by a "knight's move". For each pair of nodes 210 between which connections 312 are formed, a pair of connections can be formed, with one connection extending from the first node to the second node and another connection extending from the second node to the first node.

Figure 3B:
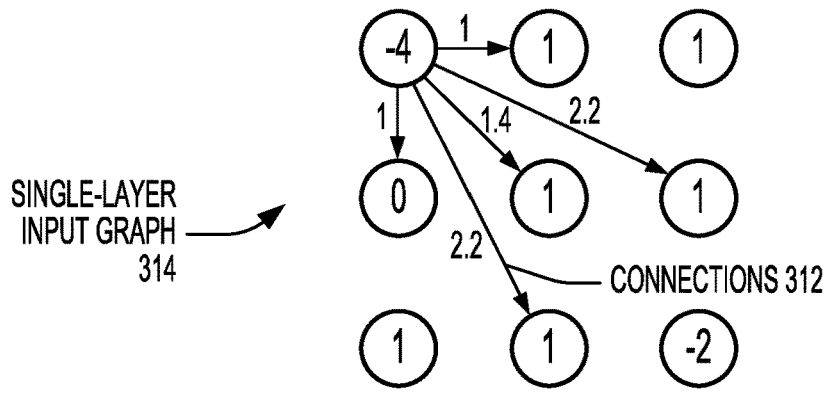

FIG. 3B illustrates an example of unit costs that may be calculated for one of the nodes (the top-left node). Each of the units costs may correspond to the cost for moving earth along a connection, and may be calculated as a function of (1) the start node and end node 2D locations, (2) the elevations of the design elevation map and the actual elevation map along the connection (e.g., at the start node and end node locations), and (3) other information such as specific machine performance parameters and soil information. In the particular illustrated example, each of the unit costs is calculated based on the 2D length of the connection without considering elevation changes between nodes.

Figure 3C:
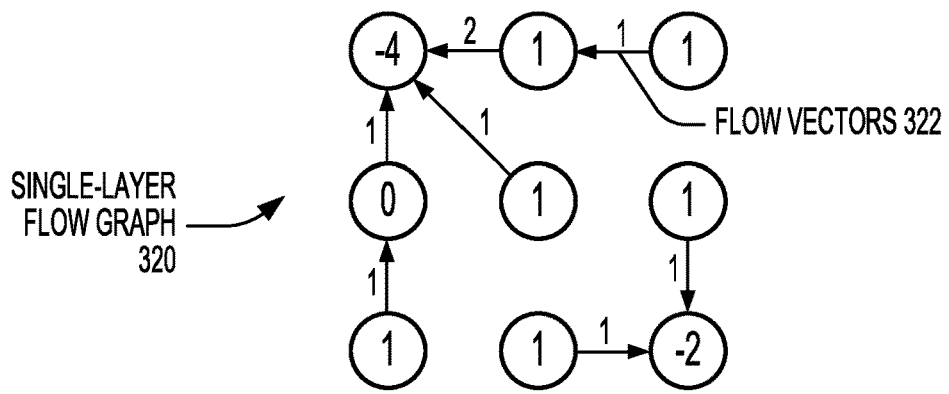

FIG. 3C illustrates an example of a single-layer flow graph 320 that may be generated by solving single-layer input graph 314. In some embodiments, single-layer input graph 314 may be solved by treating single-layer input graph 314 as defining a minimum cost flow problem. The solution to the problem aims to find the optimal flows (e.g., volume of earth to be moved) along each connection such that at each node the volume is satisfied (e.g., the flow out minus the flow in equals the node's volume value) while minimizing the total cost (e.g., the sum of each connection's flow multiplied by its unit cost). For the example solution shown in FIG. 3C, connections with zero optimal flow are not drawn.

Single-layer flow graph 320 includes a vector field of flow vectors 322 that indicate movement of earth within earthmoving site 110 along connections 312. Each of flow vectors 322 extends between two of nodes 210 similar to the corresponding connection. In some embodiments, each of flow vectors 322 give the average optimal earth flow direction and magnitude at a given node.

Figure 3D:
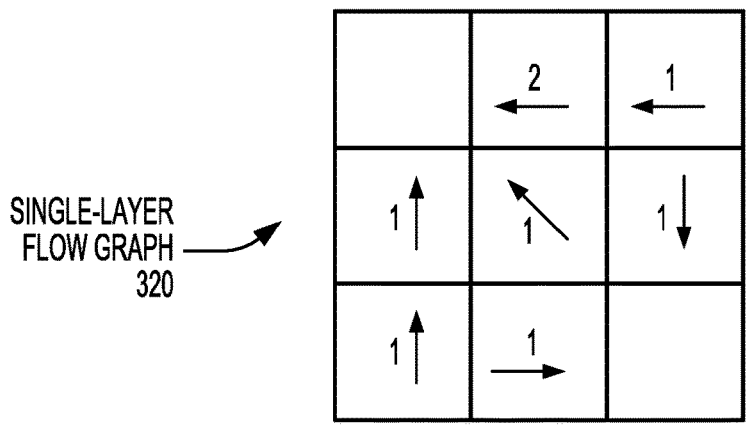

FIG. 3D illustrates an example of an alternative representation of single-layer flow graph 320. In some embodiments, flow vectors 322 at each node may be averaged by performing a flow-volume-weighted vector sum of the outgoing connections for a given node. For example, if multiple flow vectors extend outward from a given node, the flow vectors can be averaged and weighted by their magnitude/flow volume. The resulting flow vectors 322 can be displayed to provide an operator of construction machine 150 the best direction in which to push earth for each node.

Figure 3E:
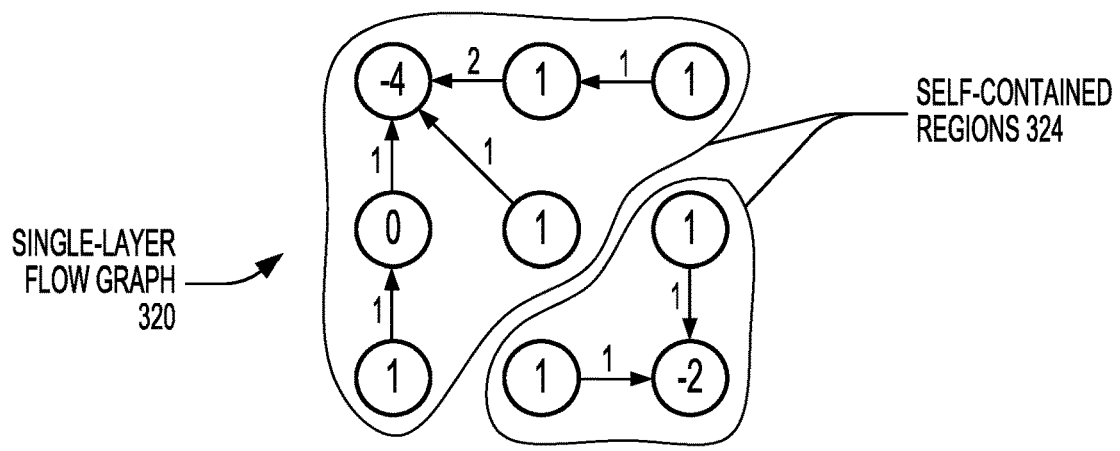

FIG. 3E illustrates an example of identifying self-contained regions 324 based on single-layer flow graph 320. In some embodiments, self-contained regions 324 may be identified by grouping nodes connected by non-zero flow vectors 322 such that each of self-contained regions 324 is contiguous and is non-overlapping with other self-contained regions 324. Each of self-contained regions 324 corresponds to a region where no earth flows in or out of the region. In some embodiments, the boundaries between self-contained regions 324 can be referred to as "part lines".

Figure 3F:
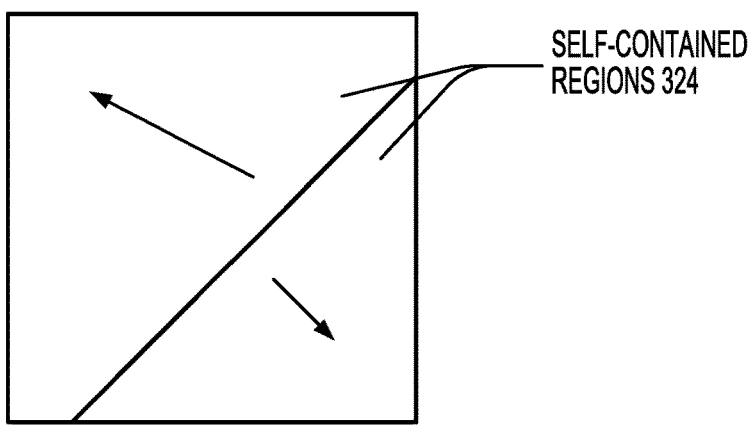

FIG. 3F illustrates an example of averaging flow vectors 322 by performing a flow-volume-weighted vector sum of all flow vectors 322 within each of self-contained regions 324. For example, if multiple flow vectors are within a given self-contained region, the flow vectors can be averaged and weighted by their magnitude/flow volume. The resulting averaged flow vectors can be displayed to provide an operator of construction machine 150 the best direction in which to push earth for each self-contained region.

Figure 4:
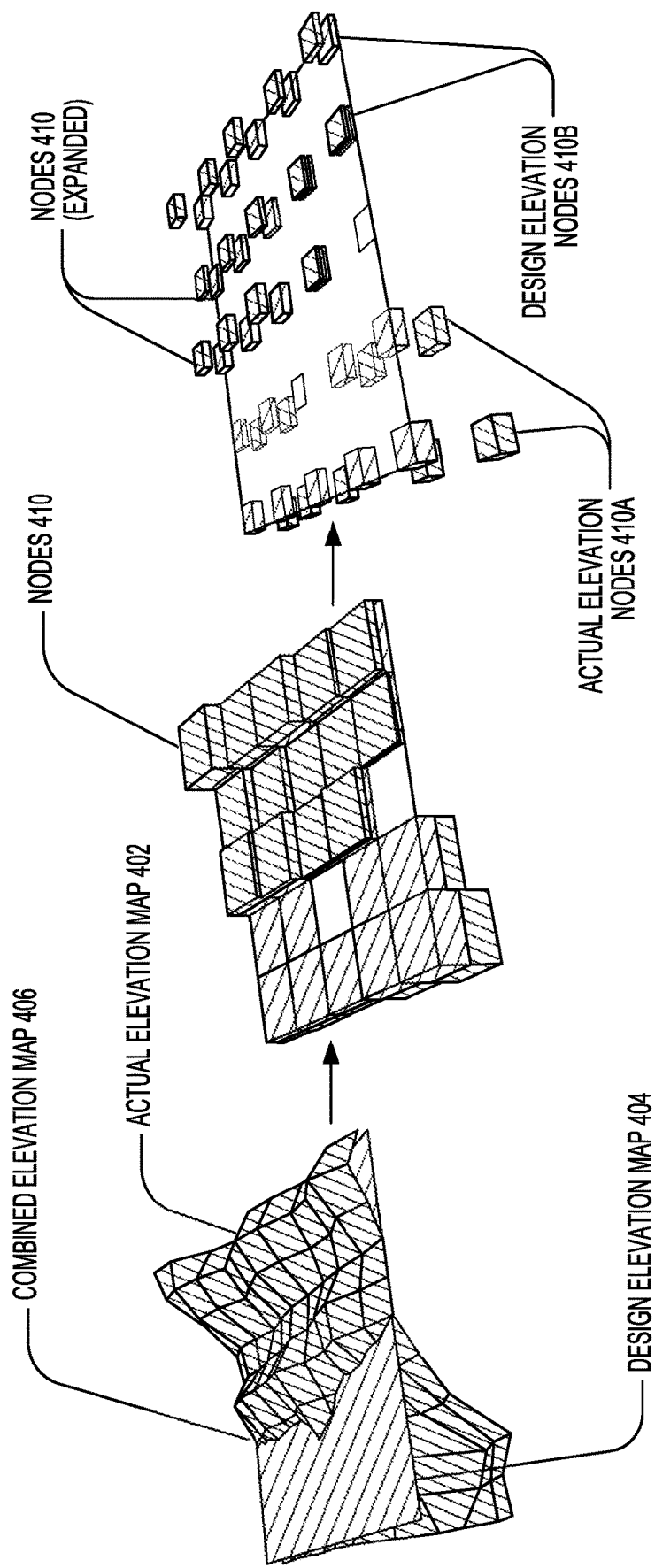
FIG. 4 illustrates examples of various steps that may be performed by a machine control system for generating a flow graph by forming a dual-layer input graph made up of multiple nodes.

FIG. 4 illustrates examples of various steps that may be performed by machine control system 100 for generating a flow graph by forming a dual-layer input graph made up of multiple nodes 410. In some embodiments, an actual elevation map 402 and a design elevation map 404 of earthmoving site 110 are obtained by machine control system 100 and are combined to create a combined elevation map 406, which may be calculated as the difference between actual elevation map 402 and design elevation map 404, as the a superposition of actual elevation map 402 and design elevation map 404, or some other combination of the elevation maps. Nodes 410 may be calculated based on combined elevation map 406 and may be spread over the same 2D area as actual elevation map 402 and design elevation map 404.

In the illustrated embodiment, nodes 410 are divided into actual elevation nodes 410A (with elevations determined by actual elevation map 402) and design elevation nodes 410B (with elevations determined by design elevation map 404). Each of actual elevation nodes 410A may be co-located in 2D with one of design elevation nodes 410B.

Figure 5:
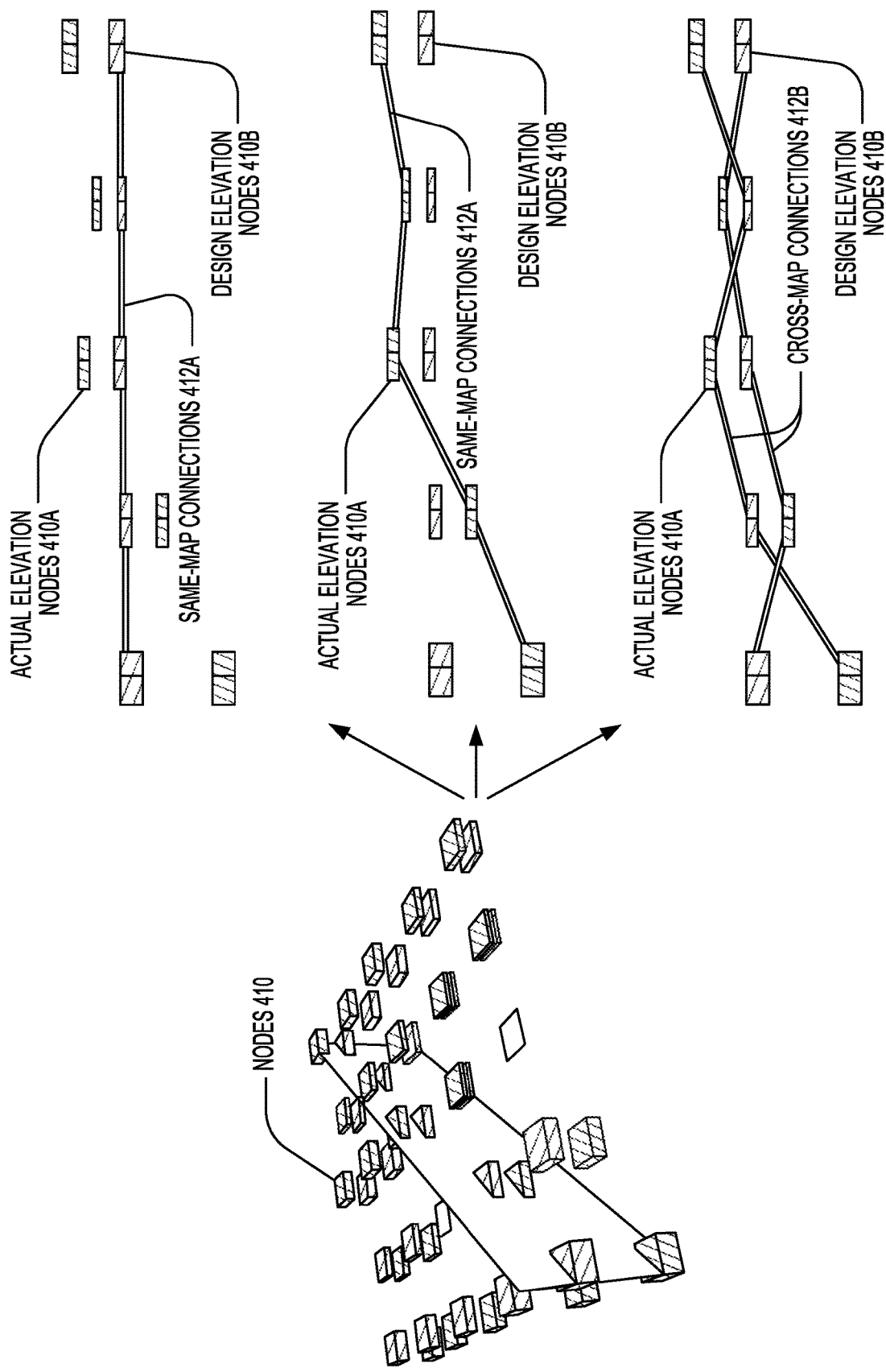
FIG. 5 illustrates example steps for forming a dual-layer input graph by forming connections between nodes.

FIG. 5 illustrates example steps for forming a dual-layer input graph by forming connections 412 between nodes 410. In the top-right of FIG. 5, same-map connections 412A are formed between design elevation nodes 410B. In the middle-right of FIG. 5, same-map connections 412 are formed between actual elevation nodes 410A. In the bottom-right of FIG. 5, cross-map connections 412B are formed between actual elevation nodes 410A and design elevation nodes 410B over 2 layers as illustrated.

Figure 6:
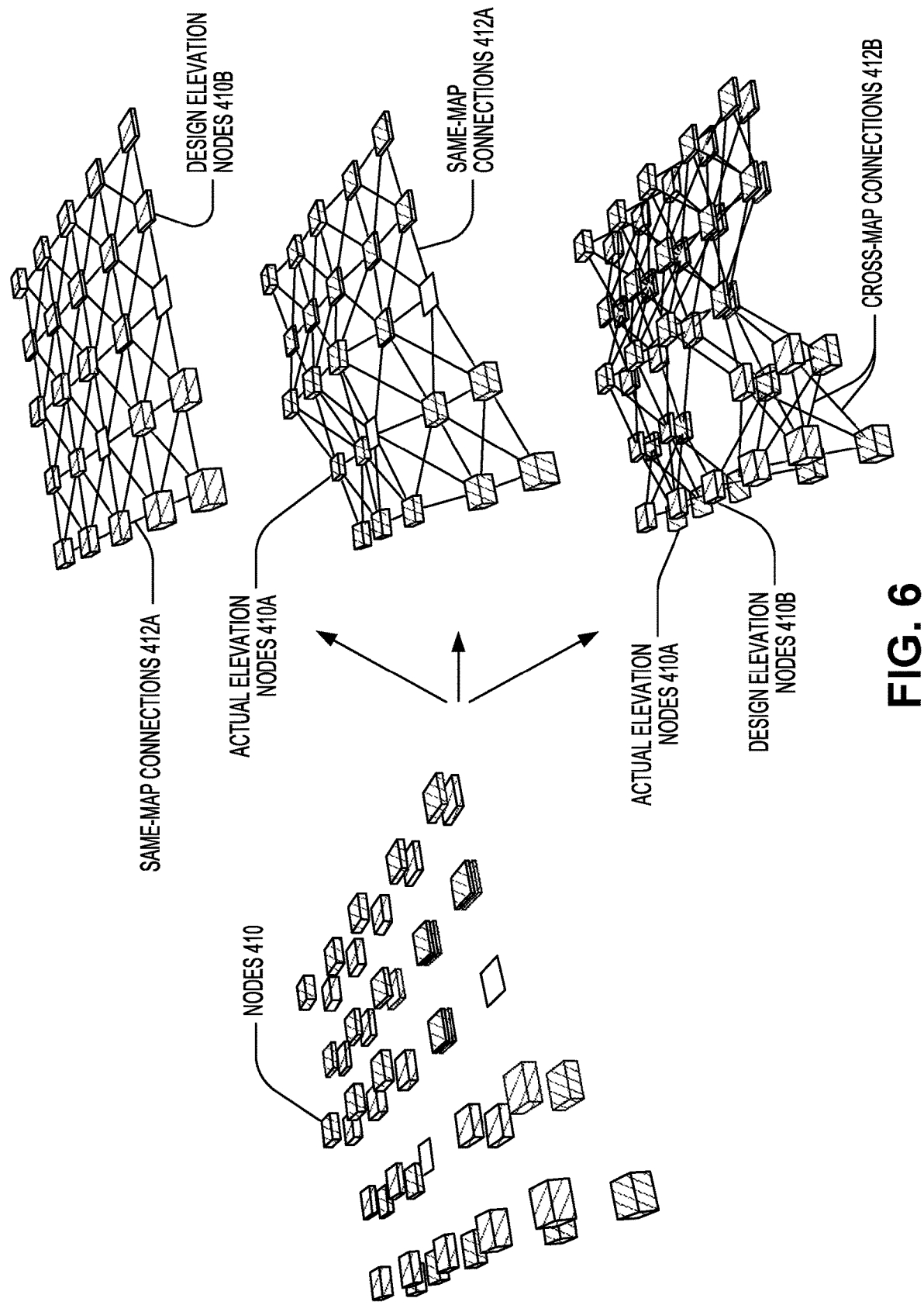
FIG. 6 illustrates example steps for forming a dual-layer input graph by forming connections between nodes.

FIG. 6 illustrates example steps for forming a dual-layer input graph by forming connections 412 between nodes 410. In the top-right of FIG. 6, same-map connections 412A are formed between design elevation nodes 410B. In the middle-right of FIG. 6, same-map connections 412 are formed between actual elevation nodes 410A. In the bottom-right of FIG. 6, cross-map connections 412B are formed between actual elevation nodes 410A and design elevation nodes 410B over 2 layers as illustrated.

Figure 7:
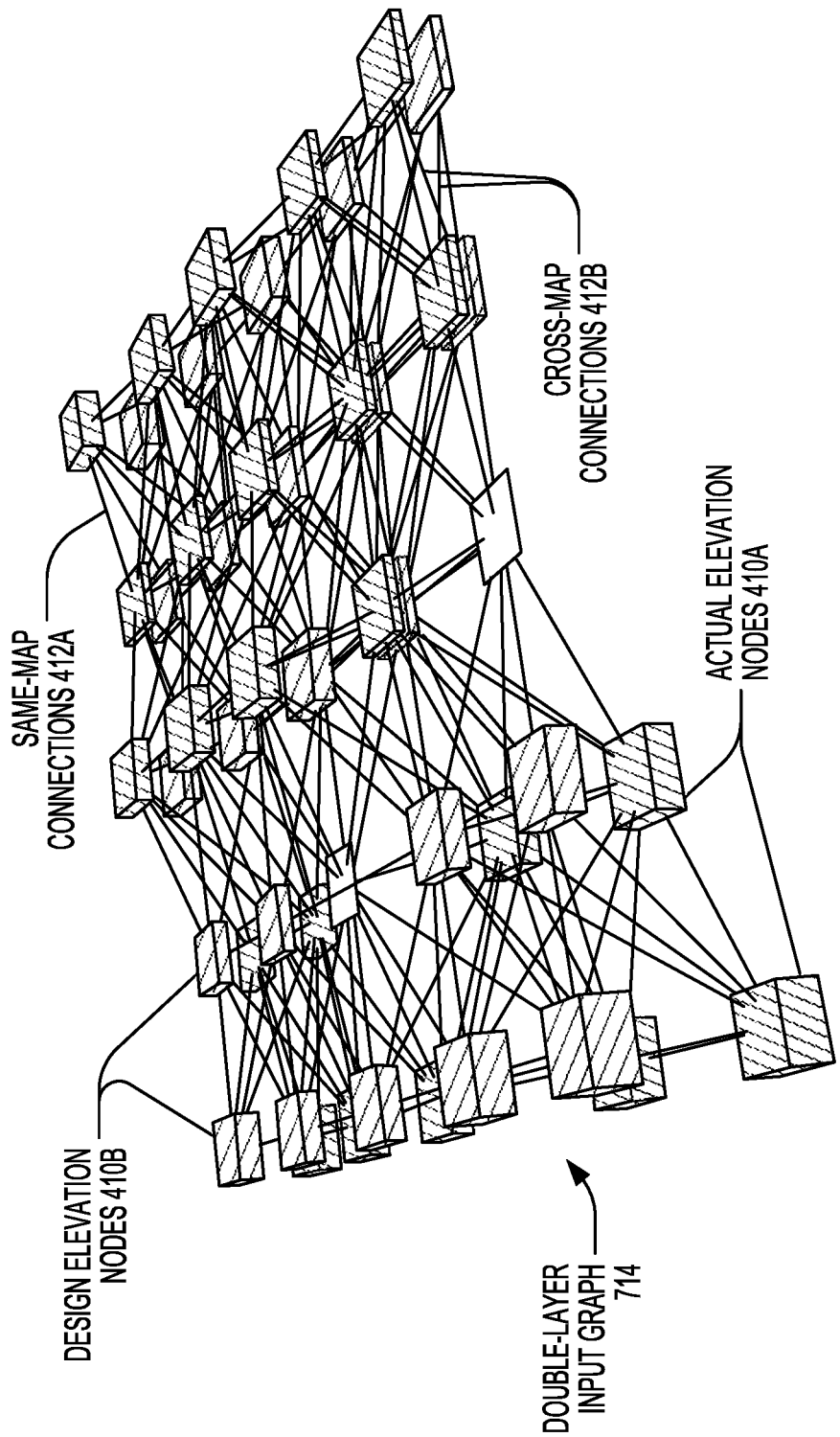
FIG. 7 illustrates an example of a dual-layer input graph formed by the steps illustrated in FIGS. 4-6.

FIG. 7 illustrates an example of a dual-layer input graph 714 formed by the steps illustrated in FIGS. 4-6. For example, dual-layer input graph 714 may include nodes 410 (including both actual elevation nodes 410A and design elevation nodes 410B) and connections 412 (including both same-map connections 412A and cross-map connections 412B).

While not illustrated in FIG. 7, in some embodiments, dual-layer input graph 714 may include a "waste/borrow node" to which each of nodes 410 is connected. The waste/borrow node may represent an offsite source or sink of material. For example, if the total cut and fill volumes on the site are not equal, material may need to be imported to or exported from the site in order to construct the design. The connections from the site nodes to the waste/borrow node may be unidirectional (with direction depending on whether there is a material surplus or deficit) and may have an equal but arbitrary unit cost.

When the minimum cost flow problem is solved on this new input graph (dual-layer input graph 714 with the waste/borrow node), the resulting flow graph indicates to the user where in the design is the optimal location(s) for material to be imported to or exported from. For example, on a site with a deficit of material (e.g., fill volume>cut volume), this approach would usually highlight the deepest fill areas as the optimal place to bring in extra material, although in some cases a shallower fill area would be highlighted if it was far from its nearest cut area. Intuitively, the highlighted areas are the most expensive areas of the site to construct with existing material, so it makes sense to bring in extra material to these areas.

Figure 8A:
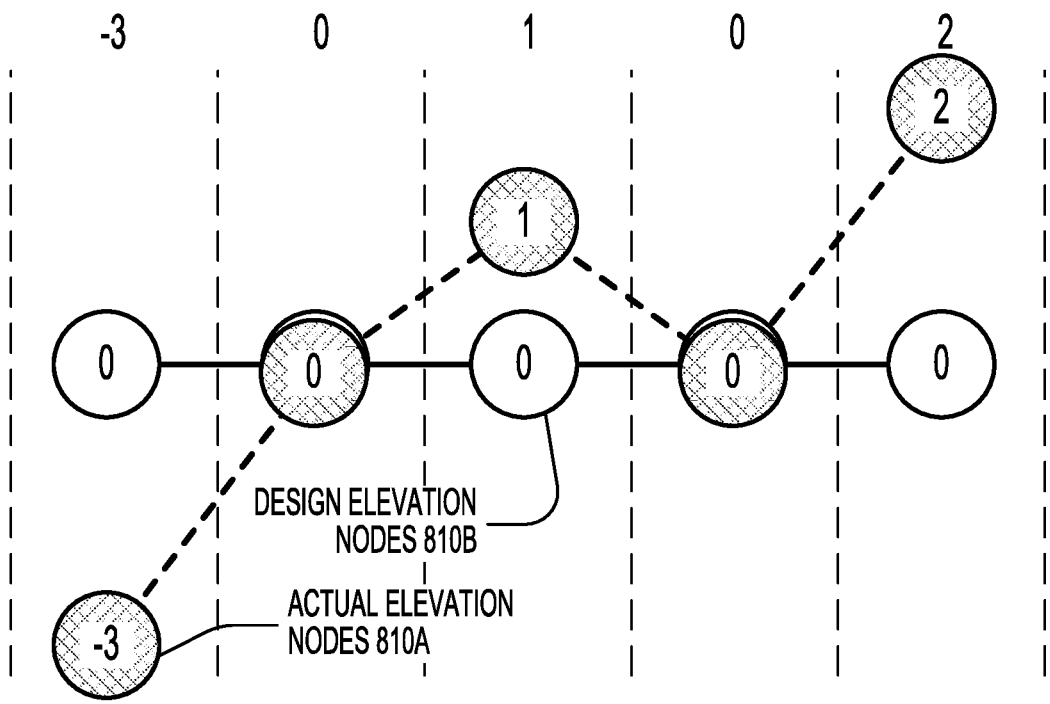
FIGS. 8A-8D illustrate examples of various steps that may be performed by a machine control system for forming a dual-layer input graph.

FIGS. 8A-8D illustrate examples of various steps that may be performed by machine control system 100 for forming a dual-layer input graph. FIG. 8A illustrates actual elevation nodes 810A and design elevation nodes 810B with their corresponding elevations labeled thereon. An elevation difference for co-located nodes may be calculated (illustrated at the top of each column). For example, for the left-most column of FIG. 8A, the elevation difference is calculated as −3 (difference between 0 and −3).

Figure 8B:
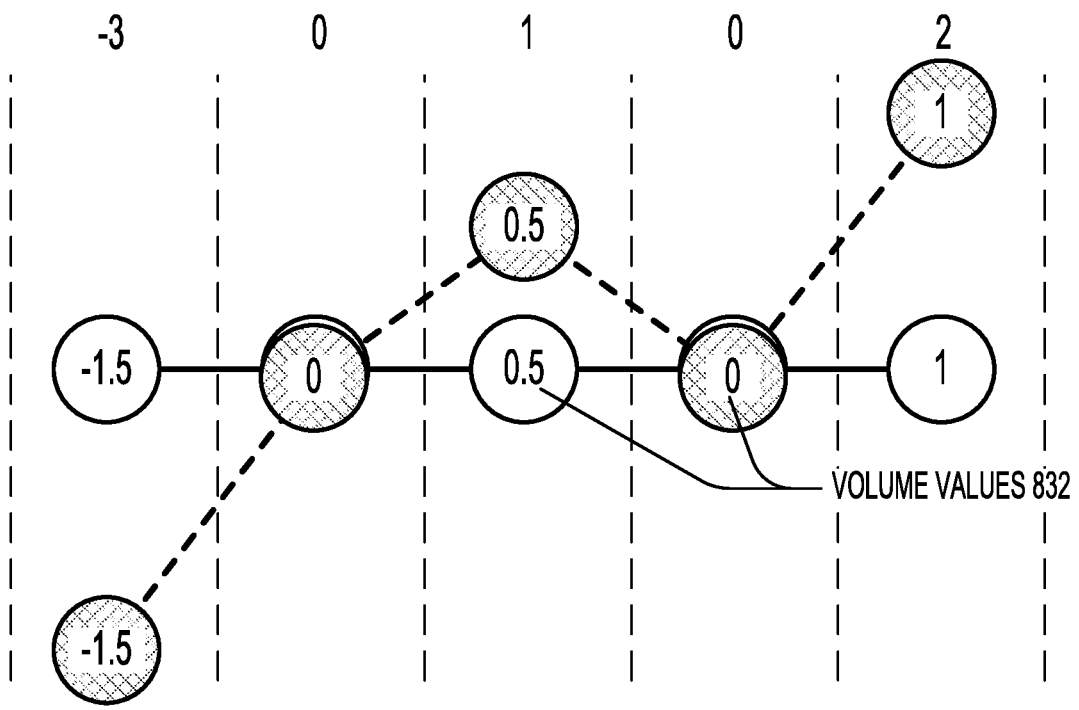

FIG. 8B illustrates actual elevation nodes 810A and design elevation nodes 810B with their corresponding volume values 832 labeled thereon. Volume values 832 may be calculated for 2 co-located nodes by dividing their elevation difference by 2. For example, for the left-most column of FIG. 8B, the volume values may be calculated as −1.5 (−3 divided by 2). As another example, for the right-most column of FIG. 8B, the volume values may be calculated as 1 (2 divided by 2).

Figure 8C:
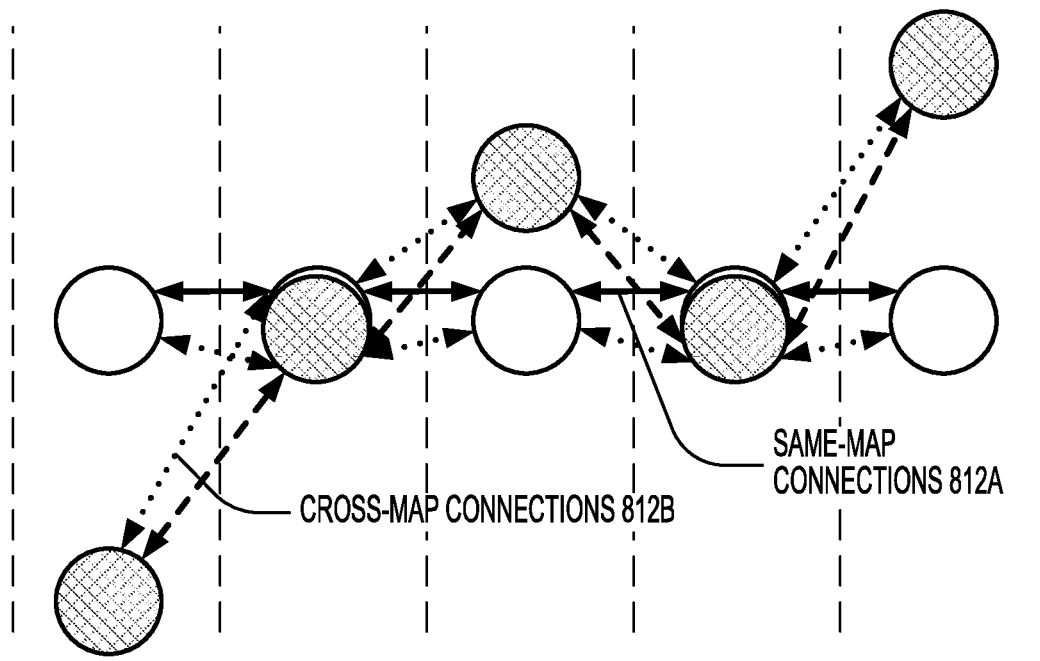

FIG. 8C illustrates example steps for forming a dual-layer input graph by forming connections 812 between nodes 810. Same-map connections 812A between actual elevation nodes 810A are illustrated as dashed lines, same-map connections 812A between design elevation nodes 810B are illustrated as solid lines, and cross-map connections 812B are illustrated as dotted lines.

Figure 8D:
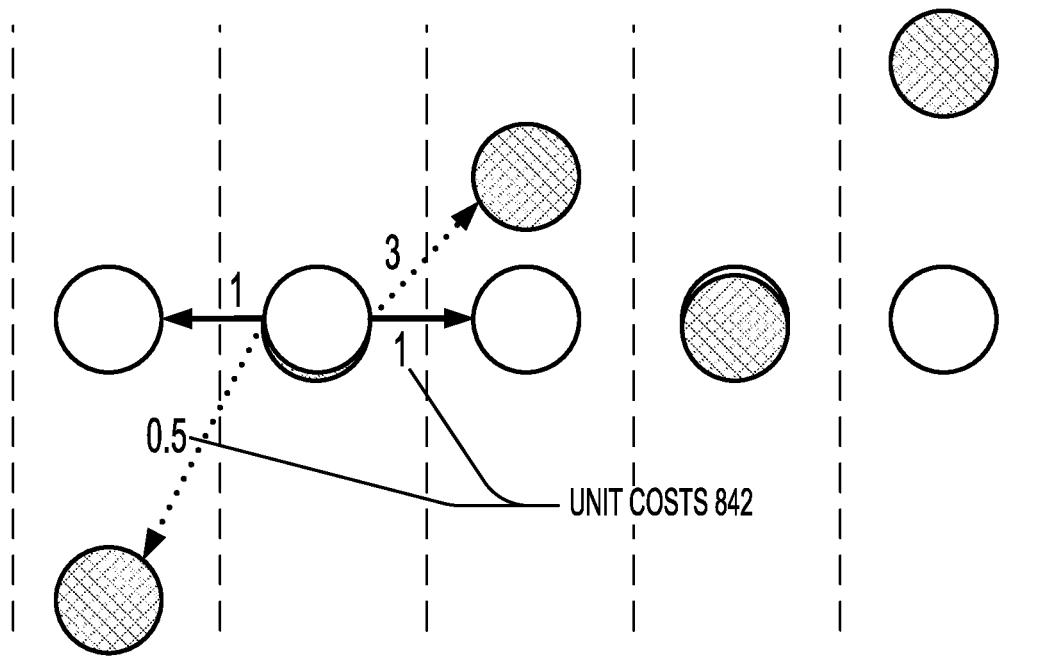

FIG. 8D illustrates an example of unit costs 842 that may be calculated for connections extending outward from one of the nodes (second left-most design elevation node). In the illustrated embodiment, each of the unit costs is calculated based on the length of the connection as well as the elevation changes between nodes. For example, the unit cost for the same-map connection extending to the left of the design elevation node is equal to 1 due to no change in elevation, the unit cost for the same-map connection extending to the right of the design elevation node is equal to 1 due to no change in elevation, the unit cost for the cross-map connection extending to the left of the design elevation node is equal to 0.5 due to the decrease in elevation, and the unit cost for the cross-map connection extending to the right of the design elevation node is equal to 3 due to the increase in elevation.

Figure 9:
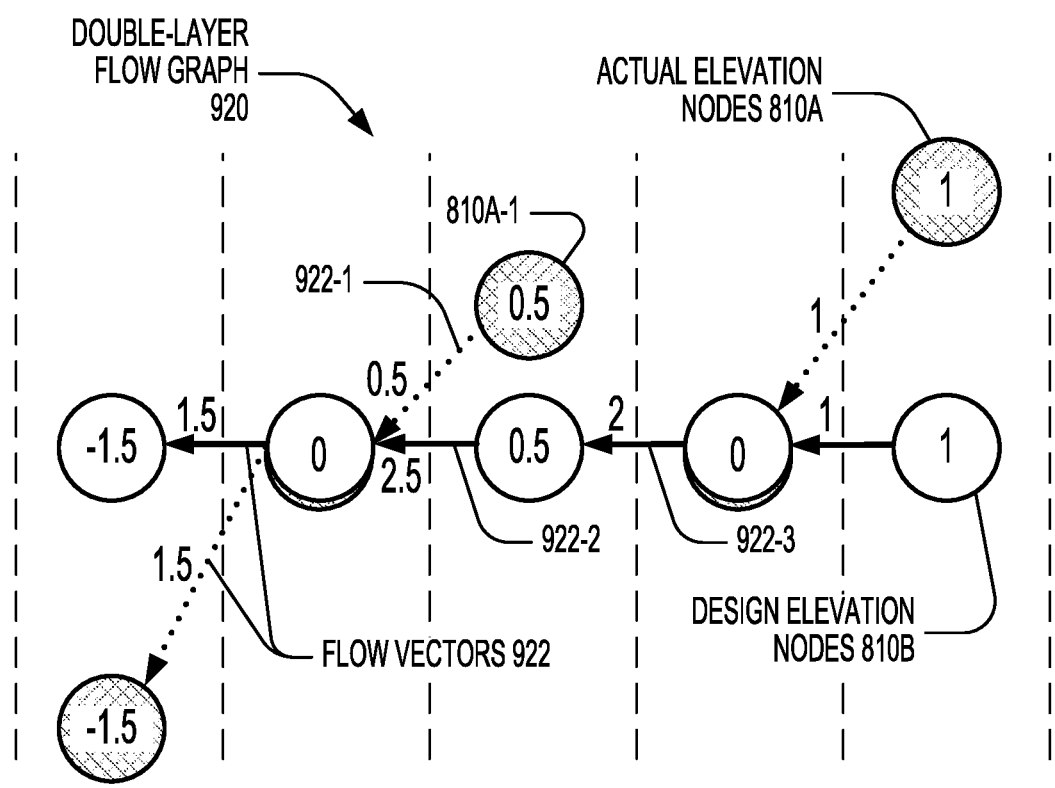
FIG. 9 illustrates an example dual-layer flow graph that may be generated by solving the dual-layer input graph formed by the steps illustrated in FIGS. 8A-8D.

FIG. 9 illustrates an example dual-layer flow graph 920 that may be generated by solving the dual-layer input graph formed by the steps illustrated in FIGS. 8A-8D. Dual-layer flow graph 920 includes a vector field of flow vectors 922 that indicate movement of earth within earthmoving site 110 along connections 812. Each of flow vectors 922 extend between two of nodes 810 similar to the corresponding connection. Flow vectors of dual-layer flow graph 920 that are equal to zero are not drawn in FIG. 9.

Figure 10A:
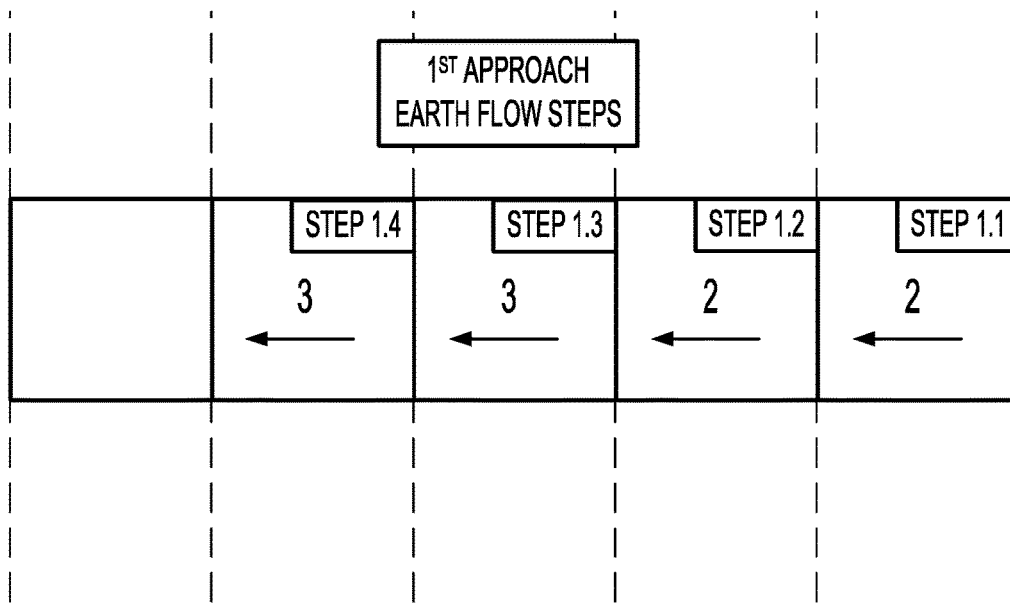
FIGS. 10A and 10B illustrate example earth flow steps that may be generated based on a dual-layer flow graph and subsequently implemented by a construction machine.
Figure 10B:
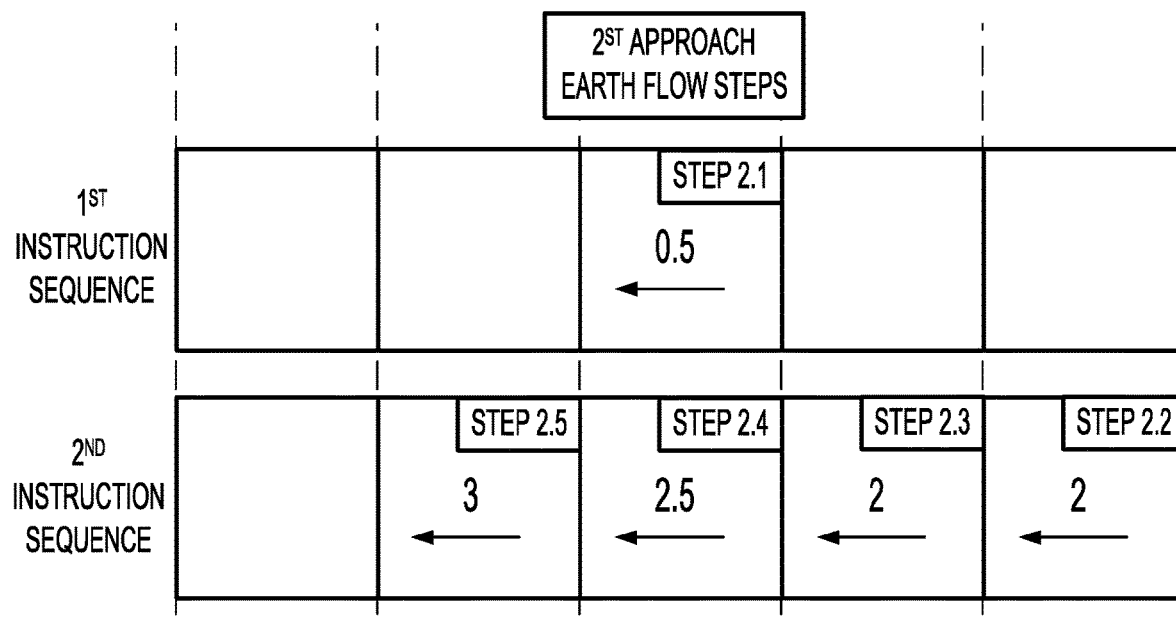
Figure 11A:
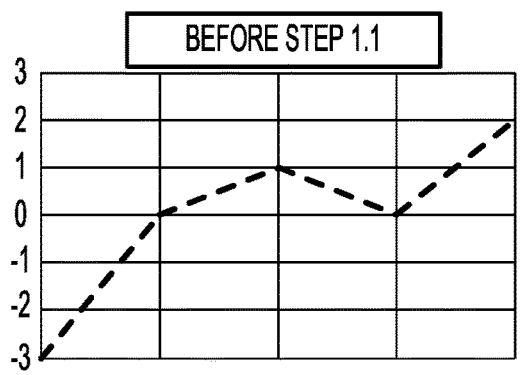
FIGS. 11A-11E illustrate a transformation of an earthmoving site from an actual elevation map to a design elevation map by performing earth flow steps in accordance with the first approach shown in FIG. 10A.
Figure 11B:
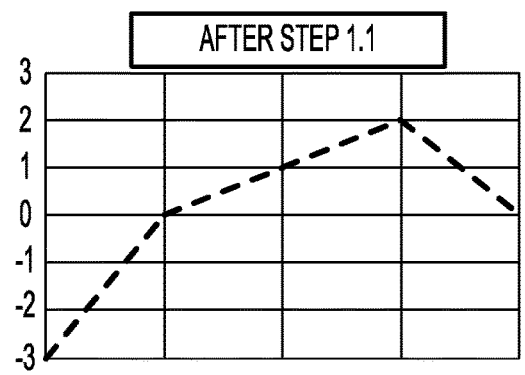
Figure 11C:
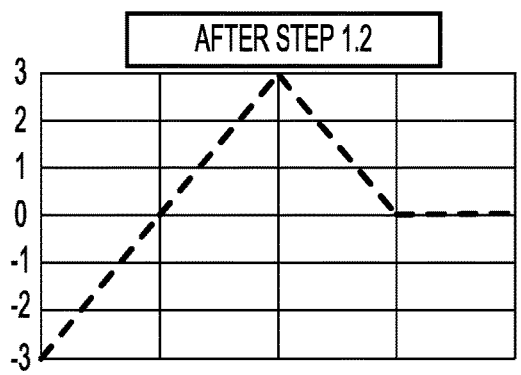
Figure 11D:
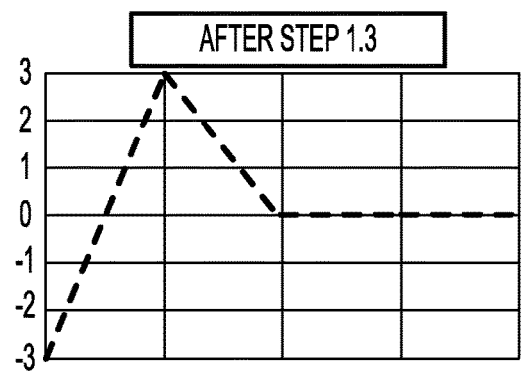
Figure 11E:
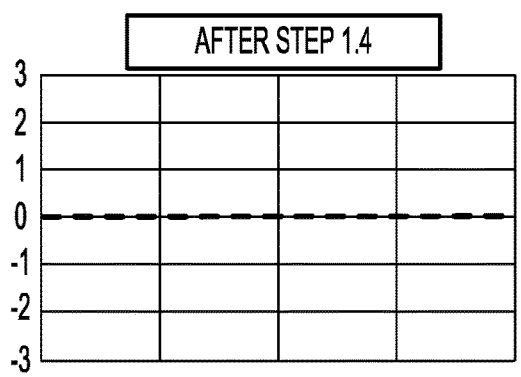
Figure 12A:
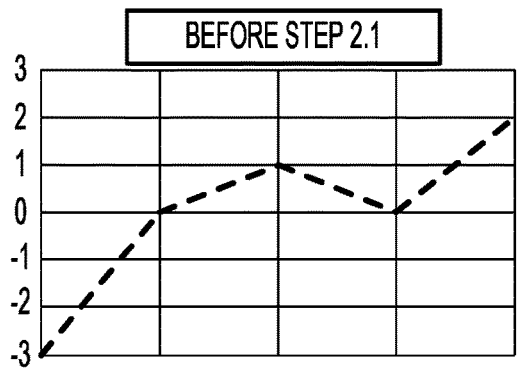
FIGS. 12A-12F illustrate a transformation of an earthmoving site from an actual elevation map to a design elevation map by performing earth flow steps in accordance with the second approach shown in FIG. 10B.
Figure 12B:
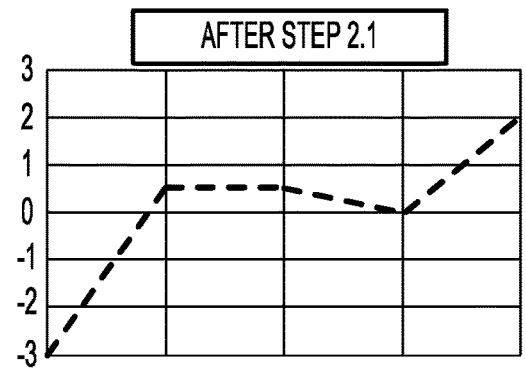
Figure 12C:
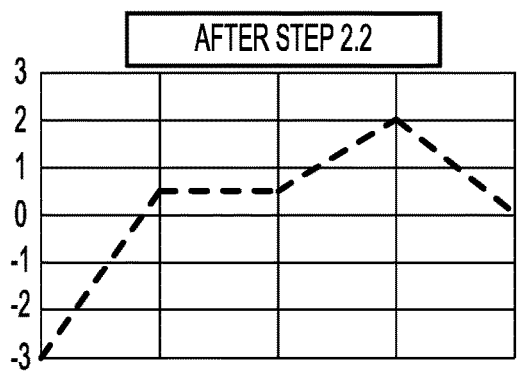
Figure 12D:
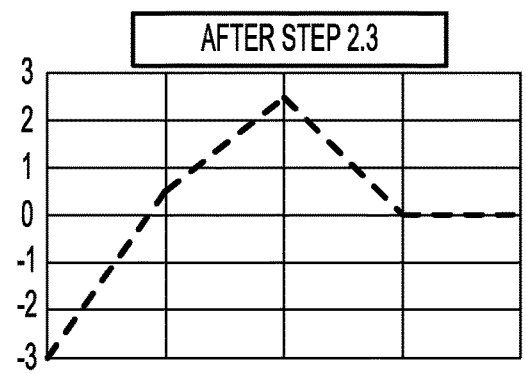
Figure 12E:
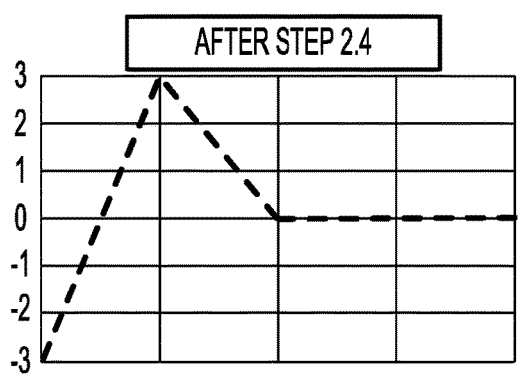
Figure 12F:
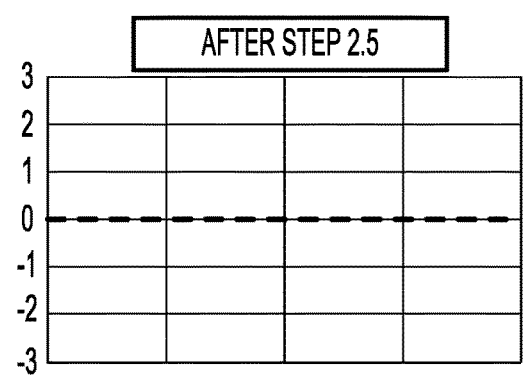

FIGS. 10A and 10B illustrate example steps that may be generated based on dual-layer flow graph 920 and subsequently implemented by construction machine 150. FIG. 10A illustrates steps generated accordance with a first approach in which flow vectors 922 extending outward from co-located nodes are summed. For example, the two flow vectors extending outward from the right-most nodes of dual-layer flow graph 920 are summed to generate step 1.1.

FIG. 10B illustrates steps generated accordance with a second approach in which flow vectors 922 that extend outward from actual elevation nodes that have higher elevations than design elevation nodes are given a higher priority than flow vectors 922 that do not. For example, referring to FIG. 9, because flow vector 922-1 extends outward from node 810A-1, which is an actual elevation node that has a higher elevation than the design elevation node with which is it co-located, flow vector 922-1 is to be performed prior to flow vectors 922-2 and 922-3. As such, flow vector 922-1 is used to generate step 2.1. By removing node 810A-1, 2 units of flow associated with flow vector 922-3 is no longer blocked by the volume value of 0.5 of node 810A-1. Otherwise, those 2 units of flow would have to take a more costly path over node 810A-1. In some embodiments, the earth flow steps can be divided into different instruction sequences as illustrated in FIG. 10B, which shows a first instruction sequence including step 2.1 and a second instruction sequence that includes steps 2.2-2.5.

FIGS. 11A-11E illustrate the transformation of earthmoving site 110 from the actual elevation map to the design elevation map by performing earth flow steps 1.1-1.4 in accordance with the first approach shown in FIG. 10A.

FIGS. 12A-12F illustrate the transformation of earthmoving site 110 from the actual elevation map to the design elevation map by performing earth flow steps 2.1-2.5 in accordance with the second approach shown in FIG. 10B.

Figure 13:
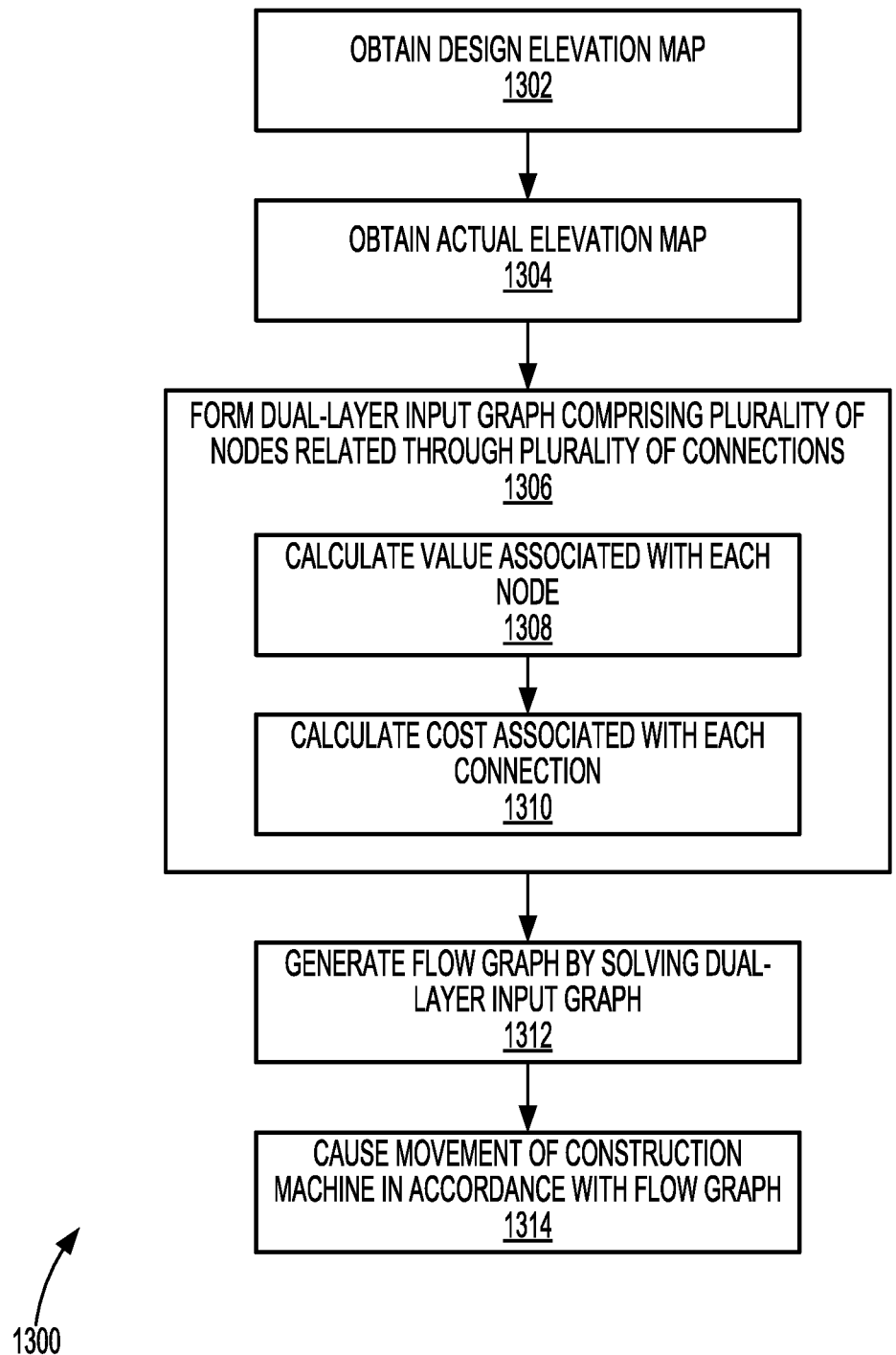
FIG. 13 illustrates a method for forming and using a dual-layer input graph.

FIG. 13 illustrates a method 1300, according to some embodiments of the present disclosure. In various embodiments, method 1300 may correspond to a method for forming a dual-layer input graph, a method for generating a flow graph, and/or a method for assisting control of a construction machine. One or more steps of method 1300 may be performed in a different order than the illustrated embodiment and/or one or more steps of method 1300 may be omitted during performance of method 1300. One or more steps of method 1300 may performed by components described herein such as construction machine 150 and/or machine control system 100.

At step 1302, a design elevation map (e.g., design elevation maps 204, 404) of an earthmoving site (e.g., earthmoving site 110) may be obtained. In some embodiments, the design elevation map includes a plurality of design elevation points of the earthmoving site.

At step 1304, an actual elevation map (e.g., actual elevation maps 202, 402) of the earthmoving site may be obtained. In some embodiments, the actual elevation map includes a plurality of actual elevation points of the earthmoving site.

At step 1306, a dual-layer input graph (e.g., dual-layer input graphs 714, 914) is formed based on the design elevation map and the actual elevation map. In some embodiments, the dual-layer input graph includes a plurality of nodes (e.g., nodes 210, 410, 810) related through a plurality of connections (e.g., connections 312, 412, 812). In some embodiments, each node of the plurality of nodes is associated with a value (e.g., volume values 832) that is calculated based on an elevation difference between the design elevation map and the actual elevation map. In some embodiments, each connection of the plurality of connections is associated with a cost (e.g., unit costs 842) for moving earth within the earthmoving site along the connection. In some embodiments, step 1306 includes one or both of steps 1308 and 1310.

In some embodiments, the plurality of nodes include a plurality of design elevation nodes (e.g., design elevation nodes 410B, 810B) and a plurality of actual elevation nodes (e.g., actual elevation nodes 410A, 810A). In some embodiments, each design elevation node of the plurality of design elevation nodes is co-located (e.g., in 2D) with a corresponding actual elevation node of the plurality of actual elevation nodes.

In some embodiments, the plurality of connections includes a plurality of same-map connections (e.g., same-map connections 412A, 812A) and a plurality of cross-map connections (e.g., cross-map connections 412B, 812B). Each same-map connection of the plural of same-map connections may extend between either (1) a first design elevation node of the plurality of design elevation nodes and a second design elevation node of the plurality of design elevation nodes or (2) a first actual elevation node of the plurality of actual elevation nodes and a second actual elevation node of the plurality of actual elevation nodes.

At step 1308, the value associated with each node of the plurality of nodes is calculated based on the elevation difference between the design elevation map and the actual elevation map. In some embodiments, an elevation for each node is first calculated. For each of the plurality of design elevation nodes, the elevation may be calculated as a point along the design elevation map. Similarly, for each of the plurality of actual elevation nodes, the elevation may be calculated as a point along the actual elevation map. Once the elevations have been calculated, a difference between the elevations for two co-located nodes (one design elevation node and one actual elevation node) may be calculated. The value associated with the two co-located nodes may be set equal to the elevation difference or may be set equal to the elevation difference divided by two, as described in reference to FIG. 8B.

At step 1310, the cost associated with each connection of the plurality of connections for moving the earth within the earthmoving site along the connection is calculated. In some embodiments, the cost is distance dependent such that the cost is at least partially a function of the distance between the nodes between which the connection extends. In some embodiments, the cost is elevation dependent such that the cost is at least partially a function of the elevation difference between the nodes between which the connection extends. In some embodiments, the cost is higher if the connection increases in elevation and is lower if the connection decreases in elevation, as described in reference to FIG. 8D.

At step 1312, a flow graph (e.g., flow graphs 120, 320, 920) is generated by solving the dual-layer input graph. In some embodiments, the flow graph includes a set of flow vectors (e.g., flow vectors 322, 922) indicating movement of earth within the earthmoving site. In some embodiments, the flow graph may include the plurality of nodes and the set of flow vectors indicating movement of earth between the plurality of nodes. For example, each of the set of flow vectors may correspond to one of the plurality of connections such that each of the set of flow vectors indicates movement of earth along one of the plurality of connections.

In some embodiments, the flow graph is a dual-layer flow graph that includes a flow vector of the set of flow vectors for each of the plurality of connections. When the flow graph is displayed for an operator, any flow vectors having a value of zero need not be displayed.

Figure 14:
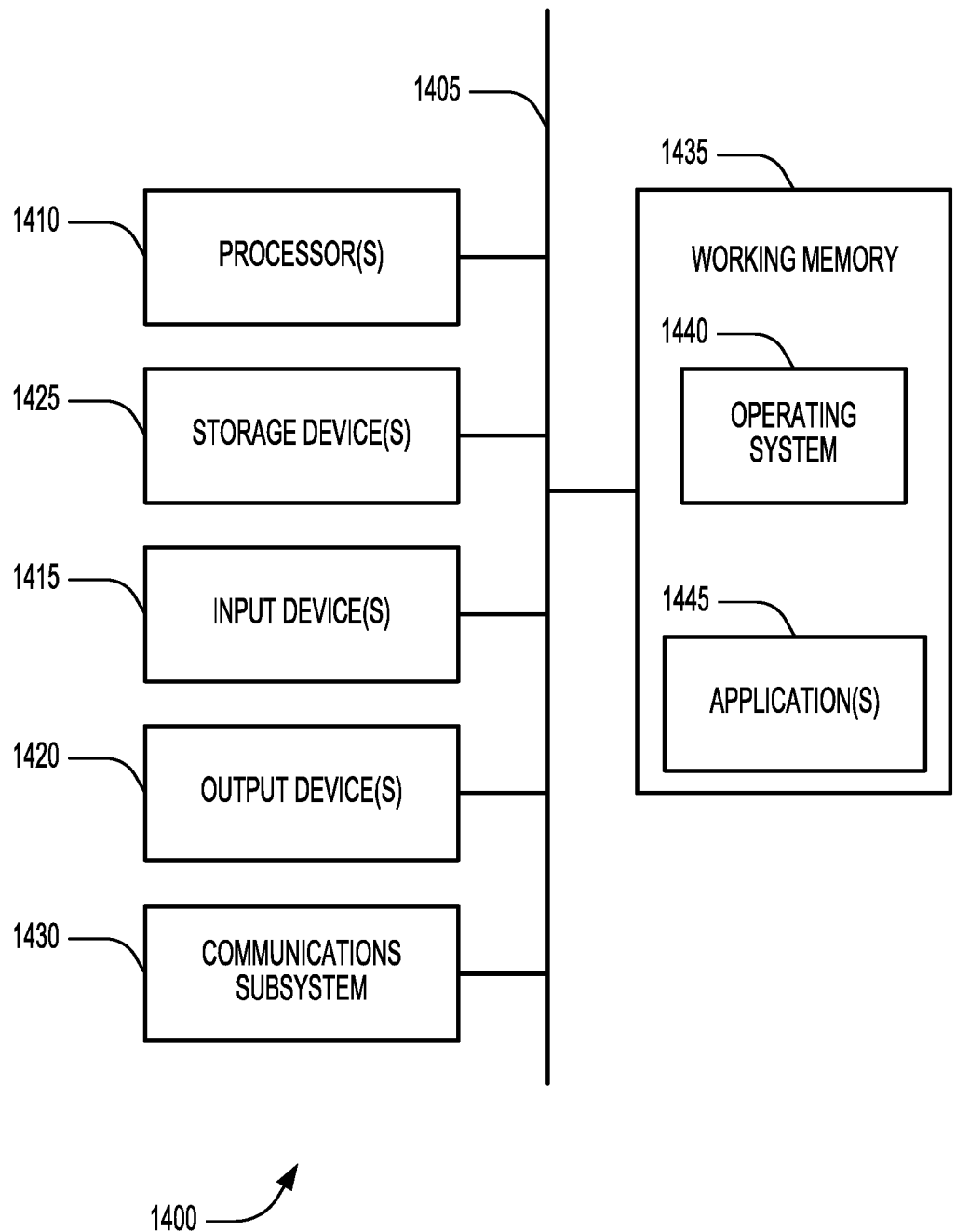
FIG. 14 illustrates a simplified computer system.

FIG. 14 illustrates a simplified computer system 1400, according to some embodiments of the present disclosure. Computer system 1400 as illustrated in FIG. 14 may be incorporated into devices such as construction machine 150 or machine control system 100, or some other device described herein. FIG. 14 provides a schematic illustration of one embodiment of computer system 1400 that can perform some or all of the steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or more integrated manner.

Computer system 1400 is shown comprising hardware elements that can be electrically coupled via a bus 1405, or may otherwise be in communication, as appropriate. The hardware elements may include one or more processors 1410, including without limitation one or more general-purpose processors and/or one or more special-purpose processors such as digital signal processing chips, graphics acceleration processors, and/or the like; one or more input devices 1415, which can include, without limitation a mouse, a keyboard, a camera, and/or the like; and one or more output devices 1420, which can include, without limitation a display device, a printer, and/or the like.

Computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1400 might also include a communications subsystem 1430, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1430 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1430. In other embodiments, a portable electronic device, e.g. the first electronic device, may be incorporated into computer system 1400, e.g., an electronic device as an input device 1415. In some embodiments, computer system 1400 will further comprise a working memory 1435, which can include a RAM or ROM device, as described above.

Computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1400 and/or might take the form of source and/or installable code, which, upon compilation and/or installation on computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1400 to perform methods in accordance with various embodiments of the technology. According to a set of embodiments, some or all of the procedures of such methods are performed by computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1400.

The communications subsystem 1430 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A control system for assisting control of a construction machine at an earthmoving site, the control system comprising:
    one or more processors; and
    one or more non-transitory computer-readable media storing instructions that, when executed by the one or more processors, cause the one or more processors to perform operations comprising:
        obtaining a design elevation map of an earthmoving site, wherein the design elevation map includes a plurality of design elevation points of the earthmoving site;
        obtaining an actual elevation map of the earthmoving site, wherein the actual elevation map includes a plurality of actual elevation points of the earthmoving site;
        forming an input graph based on the design elevation map and the actual elevation map, wherein the input graph includes a plurality of nodes related through a plurality of connections, wherein each node of the plurality of nodes is associated with a value that is calculated based on an elevation difference between the design elevation map and the actual elevation map, and wherein each connection of the plurality of connections is associated with a cost for moving earth within the earthmoving site along the connection;
        generating a flow graph by solving the input graph, wherein the flow graph includes a set of flow vectors indicating movement of the earth within the earthmoving site between neighboring nodes, wherein generating the flow graph includes determining a sequence in which the set of flow vectors are to be performed; and
        causing movement of the construction machine at the earthmoving site in accordance with the flow graph.

2. The control system of claim 1, wherein the operations further comprise:
    for each node of the plurality of nodes, calculating the value associated with the node based on the elevation difference between the design elevation map and the actual elevation map.

3. The control system of claim 1, wherein the operations further comprise:
    for each connection of the plurality of connections, calculating the cost associated with the connection for moving the earth within the earthmoving site along the connection.

4. The control system of claim 1, wherein the plurality of nodes include a plurality of design elevation nodes and a plurality of actual elevation nodes, wherein each of the plurality of design elevation nodes is co-located with a corresponding one of the plurality of actual elevation nodes.

5. The control system of claim 4, wherein the plurality of connections includes a plurality of cross-map connections, wherein each of the plurality of cross-map connections extends between one of the plurality of design elevation nodes and one of the plurality of actual elevation nodes.

6. The control system of claim 4, wherein the plurality of connections includes a plurality of same-map connections, wherein each of the plurality of same-map connections extends between:
    one of the plurality of design elevation nodes and a different one of the plurality of design elevation nodes; or
    one of the plurality of actual elevation nodes and a different one of the plurality of actual elevation nodes.

7. A computer-implemented method comprising:
    obtaining a design elevation map of an earthmoving site, wherein the design elevation map includes a plurality of design elevation points of the earthmoving site;
    obtaining an actual elevation map of the earthmoving site, wherein the actual elevation map includes a plurality of actual elevation points of the earthmoving site;
    forming an input graph based on the design elevation map and the actual elevation map, wherein the input graph includes a plurality of nodes related through a plurality of connections, wherein each node of the plurality of nodes is associated with a value that is calculated based on an elevation difference between the design elevation map and the actual elevation map, and wherein each connection of the plurality of connections is associated with a cost for moving earth within the earthmoving site along the connection; and
    generating a flow graph by solving the input graph, wherein the flow graph includes a set of flow vectors indicating movement of the earth within the earthmoving site between neighboring nodes, wherein generating the flow graph includes determining a sequence in which the set of flow vectors are to be performed.

8. The computer-implemented method of claim 7, further comprising:
    for each node of the plurality of nodes, calculating the value associated with the node based on the elevation difference between the design elevation map and the actual elevation map.

9. The computer-implemented method of claim 7, further comprising:
    for each connection of the plurality of connections, calculating the cost associated with the connection for moving the earth within the earthmoving site along the connection.

10. The computer-implemented method of claim 7, wherein the plurality of nodes include a plurality of design elevation nodes and a plurality of actual elevation nodes, wherein each of the plurality of design elevation nodes is co-located with a corresponding one of the plurality of actual elevation nodes.

11. The computer-implemented method of claim 10, wherein the plurality of connections includes a plurality of cross-map connections, wherein each of the plurality of cross-map connections extends between one of the plurality of design elevation nodes and one of the plurality of actual elevation nodes.

12. The computer-implemented method of claim 10, wherein the plurality of connections includes a plurality of same-map connections, wherein each of the plurality of same-map connections extends between:
one of the plurality of design elevation nodes and a different one of the plurality of design elevation nodes; or
one of the plurality of actual elevation nodes and a different one of the plurality of actual elevation nodes.

13. The computer-implemented method of claim 7, wherein the flow graph is a dual-layer flow graph that includes a flow vector of the set of flow vectors for each of the plurality of connections.

14. A non-transitory computer-readable medium storing instructions that, when executed by one or more processors, cause the one or more processors to perform operations comprising:
obtaining a design elevation map of an earthmoving site, wherein the design elevation map includes a plurality of design elevation points of the earthmoving site;
obtaining an actual elevation map of the earthmoving site, wherein the actual elevation map includes a plurality of actual elevation points of the earthmoving site;
forming an input graph based on the design elevation map and the actual elevation map, wherein the input graph includes a plurality of nodes related through a plurality of connections, wherein each node of the plurality of nodes is associated with a value that is calculated based on an elevation difference between the design elevation map and the actual elevation map, and wherein each connection of the plurality of connections is associated with a cost for moving earth within the earthmoving site along the connection; and
generating a flow graph by solving the input graph, wherein the flow graph includes a set of flow vectors indicating movement of the earth within the earthmoving site between neighboring nodes, wherein generating the flow graph includes determining a sequence in which the set of flow vectors are to be performed.

15. The non-transitory computer-readable medium of claim 14, further comprising:
for each node of the plurality of nodes, calculating the value associated with the node based on the elevation difference between the design elevation map and the actual elevation map.

16. The non-transitory computer-readable medium of claim 14, further comprising:
for each connection of the plurality of connections, calculating the cost associated with the connection for moving the earth within the earthmoving site along the connection.

17. The non-transitory computer-readable medium of claim 14, wherein the plurality of nodes include a plurality of design elevation nodes and a plurality of actual elevation nodes, wherein each of the plurality of design elevation nodes is co-located with a corresponding one of the plurality of actual elevation nodes.

18. The non-transitory computer-readable medium of claim 17, wherein the plurality of connections includes a plurality of cross-map connections, wherein each of the plurality of cross-map connections extends between one of the plurality of design elevation nodes and one of the plurality of actual elevation nodes.

19. The non-transitory computer-readable medium of claim 17, wherein the plurality of connections includes a plurality of same-map connections, wherein each of the plurality of same-map connections extends between:
one of the plurality of design elevation nodes and a different one of the plurality of design elevation nodes; or
one of the plurality of actual elevation nodes and a different one of the plurality of actual elevation nodes.

20. The non-transitory computer-readable medium of claim 14, wherein the flow graph is a dual-layer flow graph that includes a flow vector of the set of flow vectors for each of the plurality of connections.

* * * * *